(12) United States Patent
Mehta et al.

(10) Patent No.: US 9,309,862 B2
(45) Date of Patent: Apr. 12, 2016

(54) NUTATING FLUID-MECHANICAL ENERGY CONVERTER

(71) Applicant: HALLIBURTON ENERGY SERVICES, INC., Houston, TX (US)

(72) Inventors: Krunal Kanubhai Mehta, Gujarat (IN); Ragi Lohidakshan Poyyara, Maharashtra (IN); Amitkumar Suresh Rawool, Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/383,784

(22) PCT Filed: Nov. 25, 2013

(86) PCT No.: PCT/US2013/071739
§ 371 (c)(1),
(2) Date: Sep. 8, 2014

(87) PCT Pub. No.: WO2015/076851
PCT Pub. Date: May 28, 2015

(65) Prior Publication Data
US 2015/0211481 A1 Jul. 30, 2015

(51) Int. Cl.
*F03C 2/22* (2006.01)
*F04C 15/00* (2006.01)
(Continued)

(52) U.S. Cl.
CPC ... *F03C 2/08* (2013.01); *F01C 1/04* (2013.01); *F01C 1/045* (2013.01); *F01C 1/107* (2013.01);
(Continued)

(58) Field of Classification Search
CPC ............ F01C 1/04; F01C 1/045; F01C 1/107; F04C 18/04; F04C 18/045; F04C 2/22; F03B 17/061; F03B 3/186; F03B 13/02; E21B 4/02; F01D 1/38; F03C 2/00; F03C 2/22; F03C 4/00
USPC .......................................... 418/49, 50, 59, 22
See application file for complete search history.

(56) References Cited

U.S. PATENT DOCUMENTS 465,050 A * 12/1891 Rand et al. ..................... 417/355
493,844 A * 3/1893 Schroder ......................... 418/59
(Continued)

FOREIGN PATENT DOCUMENTS

| CN | 201902282 | 7/2011 |
|----|-----------|--------|
| CN | 202091094 | 12/2011 |

(Continued)

OTHER PUBLICATIONS

Meitner, P., "The Nutating Engine—Prototype Engine Progress Report and Test Results".*
(Continued)

*Primary Examiner* — Thomas Denion
*Assistant Examiner* — Xiaoting Hu
(74) *Attorney, Agent, or Firm* — Alan Bryson; Fish & Richardson P.C.

(57) ABSTRACT

One example of a nutating fluid-mechanical energy converter includes a stator and a rotor. The stator includes an outer cylinder having a longitudinal passage 101 and an inner guide cylinder disposed longitudinally within the outer cylinder. The inner guide cylinder and outer cylinder are concentric and define an annulus for fluid flow. A longitudinal guide is attached to an outer surface of the inner guide cylinder and extending outwardly toward an inner surface of the outer cylinder. The rotor is positioned in the annulus to be eccentric relative to the outer cylinder. The rotor has a sidewall with a guide opening to receive the longitudinal guide. Fluid flowing through the annulus imparts a torque on the rotor causing the rotor to nutate within the annulus. The nutational motion of the rotor can be converted into a rotational motion using a suitable rotary output device.

19 Claims, 4 Drawing Sheets

(51) Int. Cl.
| | | |
|---|---|---|
| *F01C 1/04* | (2006.01) | |
| *F01C 1/107* | (2006.01) | |
| *F03C 2/08* | (2006.01) | |
| *F04C 18/04* | (2006.01) | |
| *F03B 17/06* | (2006.01) | |
| *F03C 4/00* | (2006.01) | |
| *F03G 7/00* | (2006.01) | |
| *H02N 11/00* | (2006.01) | |
| *F03B 13/02* | (2006.01) | |
| *E21B 4/02* | (2006.01) | |

(52) U.S. Cl.
CPC ............... *F03B 13/02* (2013.01); *F03B 17/061* (2013.01); *F03C 4/00* (2013.01); *F03G 7/00* (2013.01); *F04C 15/0057* (2013.01); *F04C 18/04* (2013.01); *F04C 18/045* (2013.01); *H02N 11/00* (2013.01); *E21B 4/02* (2013.01); *F05B 2250/312* (2013.01); *F05B 2250/36* (2013.01)

(56) References Cited

U.S. PATENT DOCUMENTS

| | | | | |
|---|---|---|---|---|
| 547,180 | A * | 10/1895 | Nash | 418/52 |
| 1,026,992 | A * | 5/1912 | Monard | 73/257 |
| 1,229,676 | A * | 6/1917 | Tice | 418/59 |
| 1,400,822 | A * | 12/1921 | Kinney | F01C 1/107 415/72 |
| 1,459,637 | A * | 6/1923 | Poyet | 418/3 |
| 1,892,217 | A | 12/1932 | Moineau | |
| 1,906,142 | A * | 4/1933 | Ekelof | 418/59 |
| 1,967,957 | A * | 7/1934 | Lucas | 418/22 |
| 1,973,670 | A * | 9/1934 | Kruth | 418/46 |
| 2,358,721 | A * | 9/1944 | Ljungdahl | F01C 1/107 418/100 |
| 2,397,139 | A * | 3/1946 | Heaton | F01C 1/107 418/153 |
| 2,804,827 | A * | 9/1957 | Rydberg | 418/17 |
| 3,583,502 | A | 6/1971 | Henderson | |
| 4,187,061 | A | 2/1980 | Jurgens | |
| 4,773,834 | A | 9/1988 | Saruwatari | |
| 5,011,386 | A * | 4/1991 | Guttinger | 418/59 |
| 5,174,737 | A * | 12/1992 | Sakata | F04C 18/107 418/220 |
| 5,833,444 | A | 11/1998 | Harris et al. | |
| 5,833,541 | A | 11/1998 | Turner et al. | |
| 6,227,797 | B1 * | 5/2001 | Watterson et al. | 415/107 |
| 6,520,271 | B1 | 2/2003 | Martini | |
| 7,172,039 | B2 | 2/2007 | Teale et al. | |
| 7,563,080 | B2 * | 7/2009 | Masuda | 417/410.3 |
| 7,878,778 | B2 * | 2/2011 | Shimizu et al. | 418/59 |
| 8,206,140 | B2 | 6/2012 | Ooi et al. | |
| 2004/0258541 | A1 * | 12/2004 | Glatzmaier | F01C 1/107 417/410.3 |
| 2006/0073051 | A1 * | 4/2006 | Hwang et al. | 418/29 |
| 2007/0036666 | A1 * | 2/2007 | Masuda | 418/30 |
| 2009/0139769 | A1 | 6/2009 | Traylor | |
| 2009/0285054 | A1 | 11/2009 | Song | |
| 2010/0038142 | A1 | 2/2010 | Snyder et al. | |
| 2010/0233008 | A1 * | 9/2010 | Sotojima et al. | 418/209 |
| 2010/0319394 | A1 * | 12/2010 | Furusho et al. | 62/510 |
| 2011/0031020 | A1 | 2/2011 | Cote | |
| 2011/0150685 | A1 | 6/2011 | Wilbourn et al. | |
| 2012/0228875 | A1 | 9/2012 | Hardin, Jr. et al. | |
| 2013/0136639 | A1 | 5/2013 | Simpson | |
| 2014/0023540 | A1 * | 1/2014 | Heidecker et al. | 418/55.2 |

FOREIGN PATENT DOCUMENTS

| | | |
|---|---|---|
| EP | 2199599 | 6/2010 |
| WO | WO 2004/113664 | 12/2004 |
| WO | WO 2007/000122 | 1/2007 |
| WO | WO 2011/022835 | 3/2011 |

OTHER PUBLICATIONS

International Search Report and Written Opinion of the International Searching Authority issued in International Application No. PCT/US2013/071739 on Aug. 7, 2014; 11 pages.
Halliburton, "Annular Flow Area," Second Edition, H06264, May 2012, 68 pages.
Halliburton, "Downhole Equipment Technical Specification Information," H06039, May 2012, 20 pages.
Halliburton, "SperryDrill®," H07065, Sep. 2011, 65 pages.
International Search Report and Written Opinion of the International Searching Authority issued in International Application No. PCT/US2014/013926 on Oct. 31, 2014; 10 pages.

* cited by examiner

NUTATING FLUID-MECHANICAL ENERGY CONVERTER

CLAIM OF PRIORITY

This application is a U.S. National Stage of International Application No. PCT/US2013/071739, filed Nov. 25, 2013.

TECHNICAL FIELD

This disclosure relates to devices operable to convert hydraulic energy into mechanical energy.

BACKGROUND

Certain motors, e.g., vane motors, positive displacement motors, and other devices, can be powered by a fluid which is pumped through tubular structures that are connected to the motors. A vane motor, for example, can be used in applications involving commingled fluids (for example, nitrogen and drilling mud), high temperature applications and under-balanced wellbore drilling applications. Thus, such motors operate by converting a mechanical energy imparted by the flowing fluid into, e.g., a rotational energy of a motor to which multiple vanes are attached.

DESCRIPTION OF DRAWINGS

Like reference symbols in the various drawings indicate like elements.

DETAILED DESCRIPTION

This disclosure relates to a nutating fluid-mechanical energy converter. As described below, the mechanical device can be implemented to extract energy from a fluid flow and convert the extracted energy into a nutating motion. The nutating motion can then be transformed into rotation, for example, by connecting the mechanical device using a suitable linkage mechanism to another device that produces a rotary output. The energy converter can be implemented to extract energy from devices or systems through which fluid can be flowed. For example, wellbore operations such as wellbore drilling often implement tubing strings, such as drill strings, through which fluids, such as drilling mud, is flowed. Implementing the techniques described here can augment the capabilities of devices used in wellbore operations to perform additional functions such as providing rotational energy.

Figure 1A:
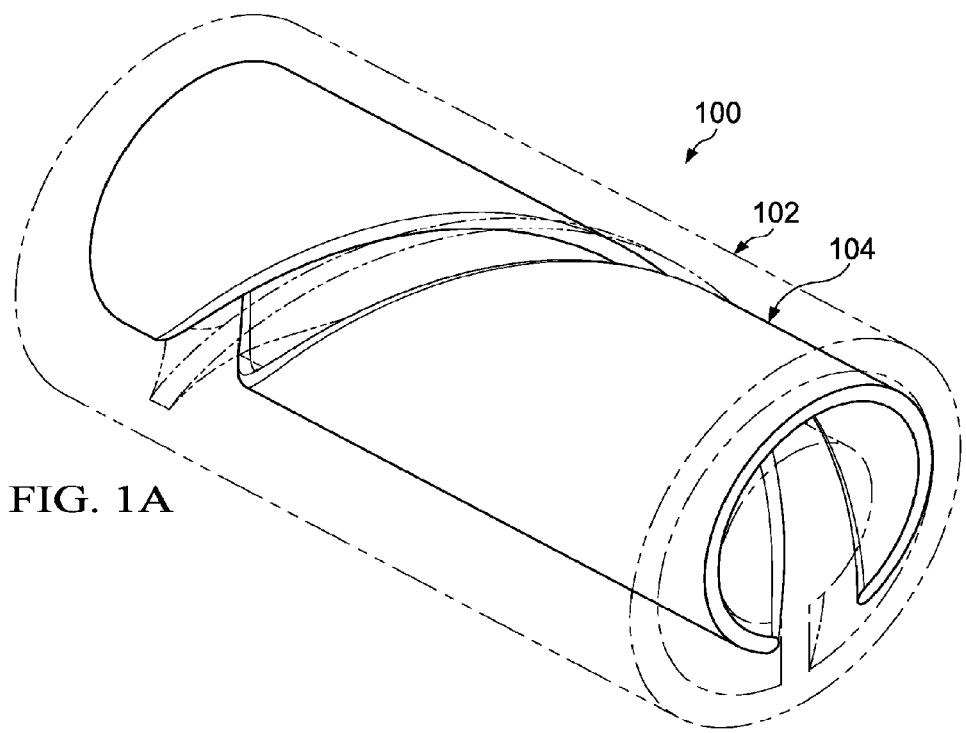
FIG. 1A is a perspective view of an assembled example nutating fluid-mechanical energy converter.

FIG. 1A is a perspective view of an assembled example nutating fluid-mechanical energy converter 100 ("device").

Figure 1B:
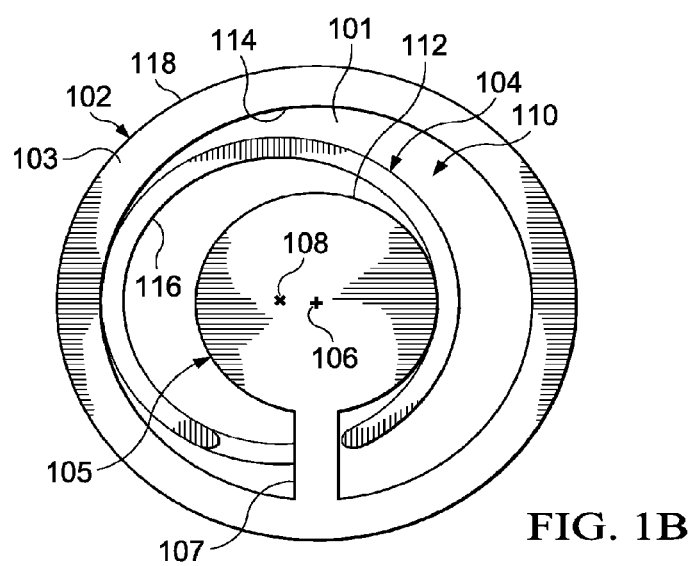
FIG. 1B is a cross-sectional view of the energy converter of FIG. 1A.

The device 100 includes a stator 102 and a rotor 104. FIG. 1B is a cross-sectional view of the device 100 of FIG. 1A. As shown in FIG. 1B, the stator 102 includes a hollow outer cylinder 103 that has a longitudinal passage 101. The stator 102 also includes an inner guide cylinder 105 positioned inside at least a portion of the outer cylinder 103, e.g., inside the longitudinal passage 101, to define an annulus 110 through which fluid (e.g., water, drilling mud, or any other fluid) can flow. The inner guide cylinder 105 can be a solid cylinder or be at least partially hollow. For example, the inner guide cylinder 105 can be a hollow cylinder with closed ends. In some implementations, the outer cylinder 103 and the inner guide cylinder 105 can be substantially concentric. For example, the axes of the outer cylinder 103 and the inner guide cylinder 105 can be co-linear.

Figure 2:
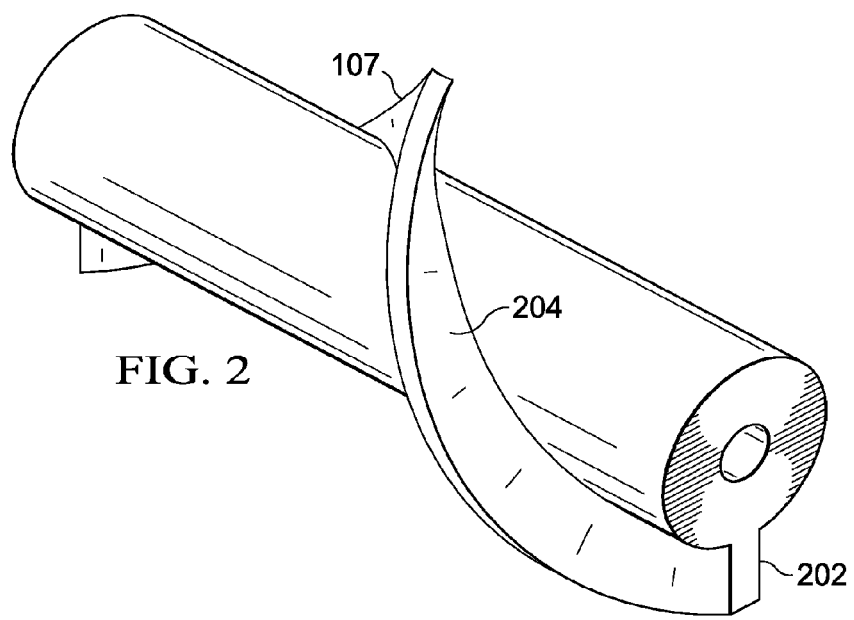
FIG. 2 illustrates an example of a longitudinal guide of the energy converter of FIG. 1A.

FIG. 2 is a perspective view of an example of a longitudinal guide of the energy converter of FIG. 1A. The stator 102 also includes a longitudinal guide 107 that is positioned inside at least a portion of the outer cylinder 103, e.g., in the annulus 110. The longitudinal guide 107 is attached to a portion of an outer surface 112 of the inner guide cylinder 105 and extends outwardly toward an inner surface 114 of the outer cylinder 103. In some implementations, the longitudinal guide 107 comprises a rectangular cross-section 202 (FIG. 2) and a rectangular side surface 204 (FIG. 2) that extends outwardly toward the inner surface 114 of the outer cylinder 103 from the outer surface 112 of the inner guide cylinder 105. As shown in FIG. 2, the longitudinal guide 107 can be a helical guide, i.e., wound helically around the outer surface 112 of the inner guide cylinder 105. The helical guide can span at least a portion of the length of the inner guide cylinder 103.

Figure 3:
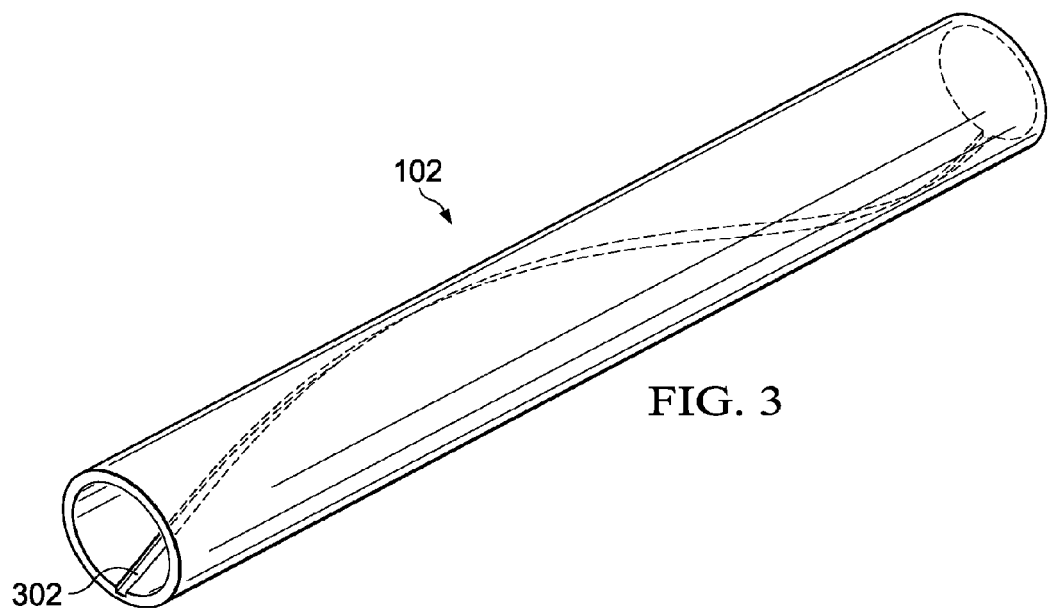
FIG. 3 illustrates an example of a groove to receive the longitudinal guide of FIG. 2.

FIG. 3 is a perspective view of an example of a groove to receive the longitudinal guide of FIG. 2. In some implementations, the longitudinal guide 107 can connect the outer surface 112 of the inner guide cylinder 105 and the inner surface 114 of the outer cylinder 103. In some implementations, the outer cylinder 103 can include a groove 302 (FIG. 3) formed in the inner surface 114. The groove 302 can span at least a length of the outer cylinder 103. The groove 302 can have a shape that is substantially similar (e.g., identical) to that of the longitudinal guide 107. For example, to receive the longitudinal guide 107 in the groove 302, the groove 302 can have the same pitch and length as the helical guide 107. In some implementations, the longitudinal guide 302 can be integrally formed with and rigidly positioned within the groove, e.g., by welding, soldering or other permanent positioning techniques. In some implementations, the longitudinal guide 107 can be removably positioned such that the longitudinal guide 107 can be removed from the annulus 110 while allowing the stator 102 to be reused.

Figure 4:
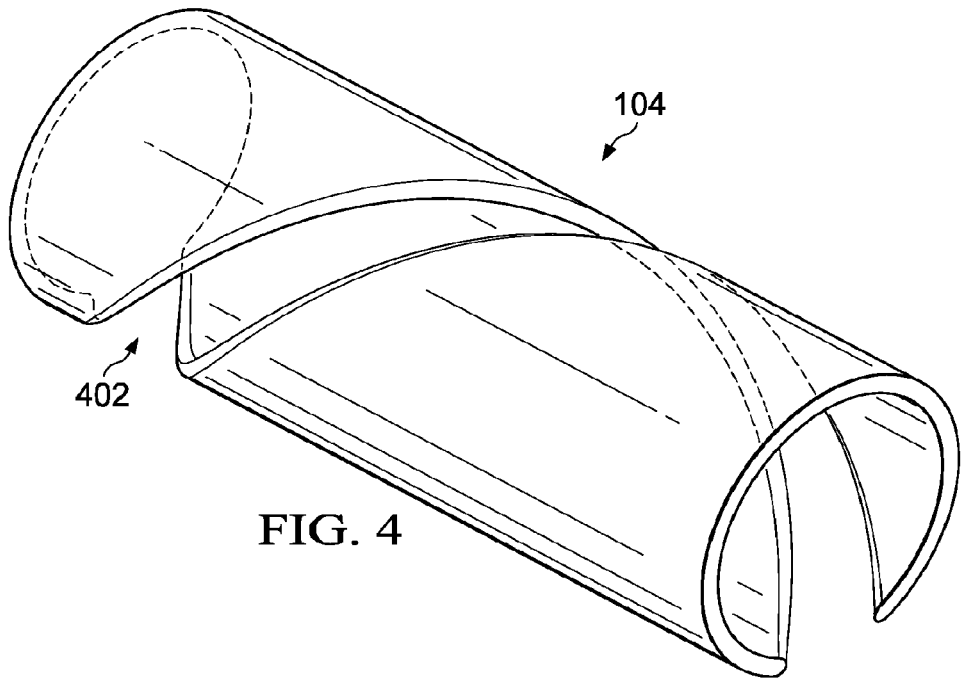
FIG. 4 illustrates an example of a rotor cylinder that nutates on the longitudinal guide of FIG. 2.

FIG. 4 is a perspective view of an example of a rotor cylinder that nutates on the longitudinal guide of FIG. 2. The device 100 can include a rotor 104 positioned in the annulus 110 defined by positioning the inner guide cylinder 105 in the longitudinal passage 101 of the outer cylinder 103. In some implementations, the rotor 102 is a rotor cylinder having guide opening 402 (FIG. 4) positioned through at least a portion of a sidewall of the rotor cylinder. In some implementations, the rotor 102 can be a sheet (e.g., a metallic sheet) that is wound to have the guide opening 402 and a cylindrical cross-section. The guide opening 402 can be formed to correspond to a shape of the longitudinal guide 107 such that the longitudinal guide 107 is received in the guide opening 402. In some implementations, a width of the guide opening 402 can be greater than a width of the longitudinal guide. For example, the width of the guide opening 402 can be twice that of a width of the rectangular surface 202. Other widths for the guide opening 402 greater than the width of the rectangular surface 202 and sufficient to decrease (or eliminate) interference between the rotor 104 and the longitudinal guide 107 during nutation (described below) are also possible.

Figure 1C:
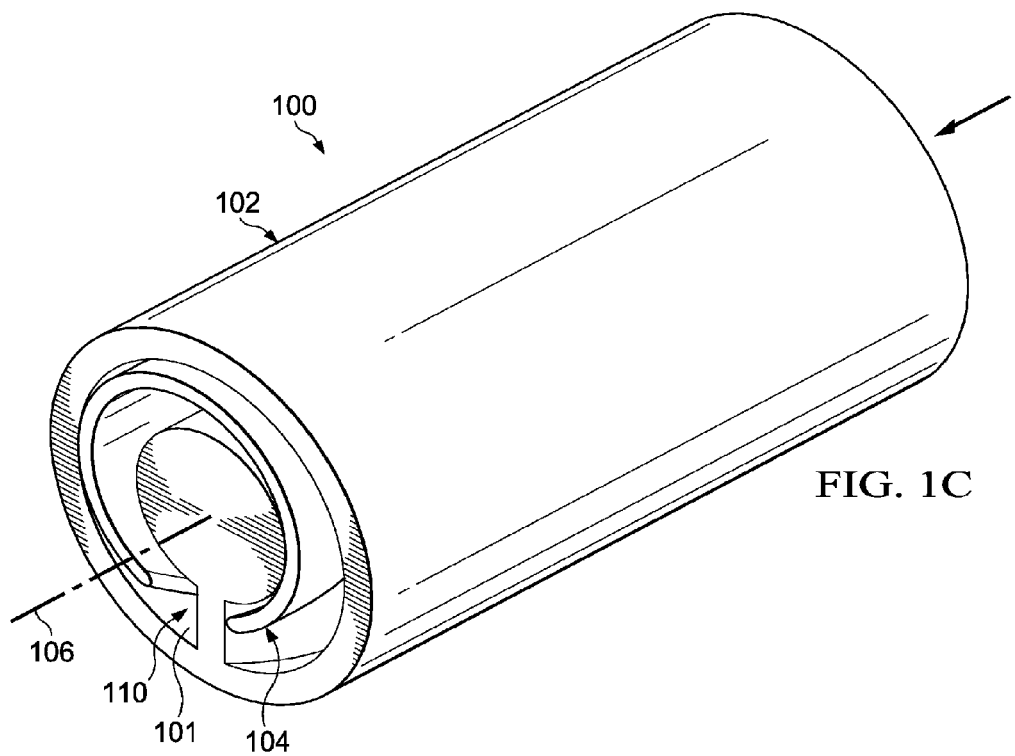
FIG. 1C is a perspective view showing fluid flow through the energy converter of FIG. 1A.

FIG. 1C is a perspective view showing a direction of fluid flow through the device 100 of FIG. 1A. Whereas the outer cylinder 103 and the inner guide cylinder 105 are concentric, as shown in FIG. 1C, the rotor 104 is eccentric relative to the outer cylinder 103 and the inner guide cylinder 105. For example, an axis of rotation 108 of the rotor 104 is offset from an axis of rotation 106 of the inner guide cylinder 105 (or the outer cylinder 103). The eccentricity of rotation of the rotor 104 about the outer cylinder 103 and the inner guide cylinder 105 can be increased by increasing a distance between an inner surface of the outer cylinder 103 and an outer surface of the inner guide cylinder 105. For example, the eccentricity of rotation of the rotor 104 can be increased by increasing by increasing a height of the longitudinal groove 107. This arrangement of the rotor 104 in the annulus 110 facilitates a nutation of the rotor 104 in the annulus 110 in response to fluid flow through the annulus. The arrangement of the stator 102 and the rotor 104 represents a single stage device 100. Additional stages can be formed by assembling additional stators and rotors in devices, as described above, and arranging the devices in series. In addition, an axial length of the device 100 can be increased by increasing a number of helical turns of the longitudinal groove 107 around the inner guide cylinder 105 and by increasing a length of the guide opening 402 in the rotor 104.

FIG. 1C illustrates fluid flowing into the annulus 110 at an end of the device 100. The fluid (e.g., water, drilling mud, or other fluid) flows along the longitudinal axis 106 of the outer cylinder 103 (or the inner guide cylinder 105). As the fluid flows through the annulus 110, the fluid contacts the rotor 104. The positioning of the guide opening 402 of the rotor 104 on the longitudinal guide 107 causes the rotor 104 to nutate within the annulus 110.

Figure 1D:
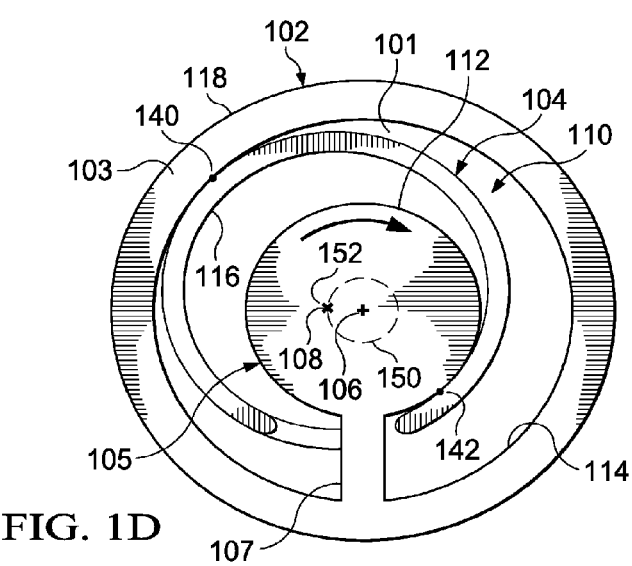
FIG. 1D is a cross-sectional view showing an example rotor cylinder nutating in the energy converter of FIG. 1A.

FIG. 1D is a cross-sectional view showing an example rotor cylinder nutating in the device 100 of FIG. 1A. As the rotor 104 nutates within the annulus 110 in response to fluid flow through the annulus 110, the axis of rotation 108 of the rotor 104 rotates about the axis of rotation 106 of the outer cylinder 103 (FIG. 1D). At a first time instant ($t_1$), the axis of rotation 108 of the rotor 104 is at a first point 152 on the circular path 150. At $t_1$, an outer surface of the rotor 104 contacts the inner surface 114 of the outer cylinder 103 (at position 140), and an inner surface of the rotor 104 contacts the outer surface 112 of the inner guide cylinder 105 (at position 142). The position 140 is diametrically opposite to the position 142, the diameter being that of the rotor 104, i.e., passing through the axis of rotation 108 of the rotor 104. At a second time instant ($t_2$) subsequent to $t_1$, the axis of rotation 108 of rotor 104 is at a second point (not shown) on the circular path 150. At $t_2$, the outer surface of the rotor 104 contacts the inner surface 114 of the outer cylinder 103 at a position that is different from position 140. Simultaneously, at $t_2$, the inner surface of the rotor 104 contacts the outer surface 112 of the inner guide cylinder 105 at a position that is different from position 142. In this manner, the rotor 104 is disposed tangentially within the annulus 110. That is, an outer surface and an inner surface of the rotor 104 continuously contact the inner surface 114 of the outer cylinder 103 and the outer surface 112 of the inner guide cylinder 105, respectively, as the rotor 104 nutates within the annulus 110. In this manner, over time, the axis of rotation 108 of the rotor 104 defines a substantially circular path 150 around the axis of rotation 106 of the outer cylinder 103. The combined rotation of the rotor 104 about the axis of rotation 108, and the rotation of the axis of rotation 108 about the axis of rotation 106 of the outer cylinder 103 represents a nutation of the rotor 104 within the annulus 110.

A direction of rotation of the rotor 104 within the annulus 110 depends on a direction in which the longitudinal guide 107 is helically wound on the inner guide cylinder 105. If the rotor 104 rotates in a clockwise direction, then the axis of rotation 108 of the rotor 104 also rotates on the circular path 150 in the clockwise direction, and vice versa. The guide opening 402 is positioned on the longitudinal guide 107 such that the rotor 104 receives a torque generated in response to flow of the fluid through the annulus 110, the torque being responsible for the nutation of the rotor 104 described above. To decrease (or eliminate) a wear that can result from the nutation of the rotor 104, a polymeric material (e.g., an elastomer, a rubber such as nitrile butadiene rubber, or other wear-resistant material such as those used in mud motors) can be disposed on the inner surface 114 of the outer cylinder 103 or the outer surface 112 of the inner guide cylinder 105 or on an outer surface of the longitudinal guide 107 (or combinations of them).

Figure 5:
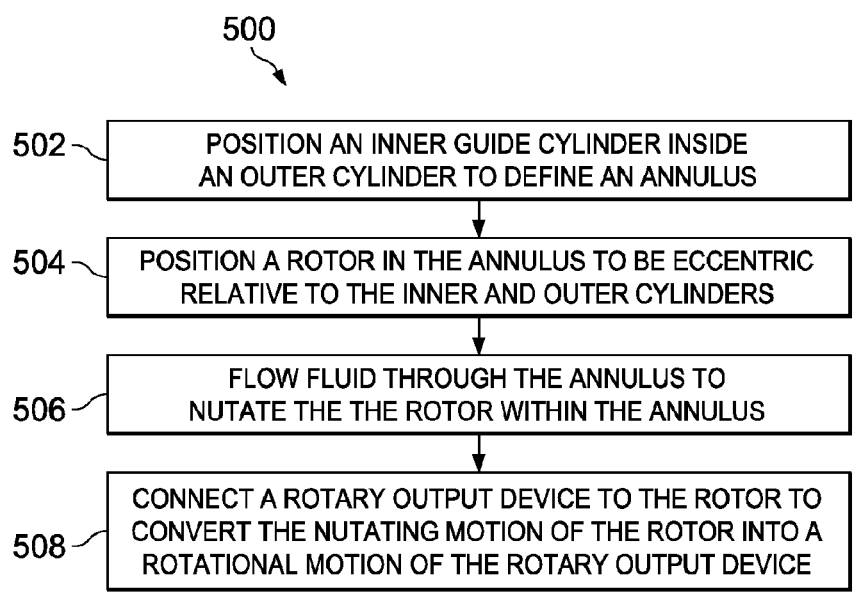
FIG. 5 is a flowchart of an example process for generating rotary output by implementing the energy converter of FIG. 1A.

FIG. 5 is a flowchart of an example process 500 for generating rotary output by implementing the energy converter of FIG. 1A. At 502, the inner guide cylinder 105 can be positioned inside the outer cylinder 103 to define the annulus 110, as described above. At 504, the rotor 104 can be positioned in the annulus 110 to be eccentric relative to the outer cylinder 105 and inner guide cylinder 103, which are concentric. At 506, fluid can be flowed through the annulus 110. When the fluid is pumped into the annulus 110, the fluid imparts a torque on the rotor 104. The nature of a cavity formed by positioning the rotor 104 in the annulus 110 is such that the fluid is not trapped in the cavity, unlike a positive displacement motor such as mud motors. Also, the cavity is a single annulus as opposed to multiple cavities. The profile of the cavity is such that for a specified flow rate and pressure drop, torque is imparted to the rotor 104.

The torque imparted to the rotor 104 includes two components—a pressure component and a viscous component. Above a threshold flow rate, the viscous component is insignificant relative to the pressure component. The resultant of the pressure exerts a net torque on the rotor 104. A computational model of a device 100 was developed in which the device 100 was between 18 inches and 20 inches in length. The outer cylinder 103 and the inner guide cylinder 105 were modeled to have diameters of 11 inches outer diameter of outer stator and 5 inches outer diameter of inner stator, respectively. The rotor 104 was modeled to have a outer diameter of 7.55 inches. The dimensions provided here are exemplary; computational models that have other dimensions can be developed to study the flow through the device 100. Fluid having a viscosity of that of drilling mud was modeled to flow through the annulus 110 at flow rates shown in the table below. The table also shows change in torque and pressure drop at the different volumetric flow rates.

| Flow Rate (kg/s) | Torque (ft · lbf) | Pressure drop (psi) |
| --- | --- | --- |
| 40 | 117 | 11.9 |
| 50 | 176 | 16.9 |
| 60 | 259 | 24.5 |

The data in the table above shows that torque is directly proportional to the flow rate/pressure drop. The shape of the cavity changes continuously and periodically, e.g., in a sinusoidal manner. At 508, a rotary output device can be connected to the rotor 104. The rotary output device, which can include a crank and a rotatable shaft, can rotate in response to receiving the nutation of the rotor 104. In this manner, the nutational motion in the device 100 can be converted into a rotational motion of the rotary output device. More broadly, a fluid mechanical energy generated by flowing fluid through the device 100 can be converted into a rotational kinetic energy of the rotary output device.

A number of implementations have been described. Nevertheless, it will be understood that various modifications may be made without departing from the spirit and scope of the disclosure.

The invention claimed is:

1. A fluid-mechanical device comprising:
   a stator comprising:
      an outer cylinder having a longitudinal passage;
      an inner guide cylinder disposed longitudinally within the outer cylinder, the inner guide cylinder and outer cylinder defining an annulus for flow of a fluid; and
      a longitudinal guide positioned inside at least a portion of the outer cylinder, the longitudinal guide attached to a portion of an outer surface of the inner guide cylinder and extending outwardly toward an inner surface of the outer cylinder, wherein the longitudinal guide comprises a helical guide spanning at least a portion of a length of the inner guide cylinder; and
   a rotor positioned in the annulus, the rotor including a rotor cylinder having a sidewall with a guide opening that receives the longitudinal guide.

2. The device of claim 1, wherein the outer cylinder and the inner guide cylinder are concentric, and the rotor cylinder is eccentric relative to the outer cylinder and the inner guide cylinder.

3. The device of claim 1, wherein a width of the guide opening is greater than a width of the longitudinal guide.

4. The device of claim 1, wherein the longitudinal guide comprises a rectangular cross-section and a rectangular side surface that extends outwardly toward the inner surface of the outer cylinder from the outer surface of the inner guide cylinder.

5. The device of claim 1, wherein the longitudinal guide connects the outer surface of the inner guide cylinder and the inner surface of the outer cylinder.

6. The device of claim 1, wherein the outer cylinder includes a groove formed in the inner surface of the outer cylinder to receive the longitudinal guide, the groove spanning at least a length of the outer cylinder.

7. The device of claim 1, wherein an outer surface of the rotor cylinder continuously contacts the inner surface of the outer cylinder as the rotor cylinder nutates in response to flow of the fluid through the annulus, and wherein an inner surface of the rotor cylinder continuously contacts the outer surface of the inner guide cylinder as the rotor cylinder nutates in response to flow of the fluid through the annulus.

8. The device of claim 1, further comprising a polymeric material disposed on the inner surface of the outer cylinder.

9. The device of claim 1, further comprising a polymeric material disposed on the outer surface of the inner guide cylinder.

10. The device of claim 1, further comprising a polymeric material disposed on an outer surface of the longitudinal guide.

11. The device of claim 1, wherein the inner guide cylinder is a solid cylinder.

12. The device of claim 1, wherein the guide opening is positioned on the longitudinal guide such that the rotor cylinder receives a torque generated in response to flow of the fluid through the annulus.

13. A system for generating a rotary output, the system comprising:
   a fluid-mechanical device comprising:
      an outer cylinder having a longitudinal passage there through;
      an inner guide cylinder disposed longitudinally within the outer cylinder, the inner guide cylinder and outer cylinder defining an annulus for flow of a fluid;
      a longitudinal guide positioned inside at least a portion of the outer cylinder, the longitudinal guide attached to a portion of an outer surface of the inner guide cylinder and extending outwardly toward an inner surface of the outer cylinder, wherein the longitudinal guide comprises a helical guide spanning at least a portion of a length of the inner guide cylinder;
      a rotor cylinder comprising a sidewall with a guide opening to receive the longitudinal guide, wherein the outer cylinder and the inner guide cylinder are concentric, and the rotor cylinder is eccentric relative to the outer cylinder and the inner guide cylinder; and
   a rotary output device connected to the fluid-mechanical device, the rotatory output device rotating in response to flow of the fluid through the annulus.

14. The system of claim 13, wherein an outer surface of the rotor cylinder continuously contacts the inner surface of the outer cylinder in response to flow of the fluid through the annulus, and wherein an inner surface of the rotor cylinder continuously contacts the outer surface of the inner guide cylinder in response to flow of the fluid through the annulus.

15. The system of claim 13, wherein the rotary output device comprises a crank attached to a rotatable shaft that rotates in response to the flow of the fluid through the annulus.

16. A method for generating a rotary output, the method comprising:
   positioning an inner guide cylinder in an outer cylinder having a longitudinal passage there through to define an annulus for flow of a fluid, wherein the inner guide cylinder and the outer cylinder are concentric, and wherein a longitudinal guide is positioned inside at least a portion of the outer cylinder, the longitudinal guide attached to a portion of an outer surface of the inner guide cylinder and extending outwardly toward an inner surface of the outer cylinder, wherein the longitudinal guide comprises a helical guide spanning at least a portion of a length of the inner guide cylinder;
   positioning a rotor cylinder in the annulus to be eccentric relative to the inner guide cylinder and the outer cylinder, the rotor cylinder comprising a guide opening positioned through at least a portion of a sidewall of the rotor cylinder, the guide opening to be received on the longitudinal guide;
   flowing a fluid through the annulus, wherein a torque is imparted on the rotor cylinder in response to the fluid flowing through the annulus, the torque causing the rotor cylinder to nutate in the annulus on the longitudinal guide; and
   connecting a rotary output device to the rotor cylinder, wherein the rotary output device rotates in response to receiving a nutation rotation of the rotor cylinder on the longitudinal guide.

17. The method of claim 16, further comprising disposing a polymeric material on the inner surface of the outer cylinder, the outer surface of the inner guide cylinder, and an outer surface of the longitudinal guide.

18. The method of claim 16, wherein positioning the rotor cylinder in the annulus comprises positioning the rotor cylinder such that an outer surface of the rotor cylinder continuously contacts the inner surface of the outer cylinder, and an inner surface of the rotor cylinder continuously contacts the outer surface of the inner guide cylinder.

19. The method of claim 16, further comprising positioning the longitudinal guide inside at least a portion of the outer cylinder to connect the outer surface of the inner guide cylinder and the inner surface of the outer cylinder.

\* \* \* \* \*